Dec. 2, 1952 J. G. HERZBERG 2,619,878
APPARATUS FOR MACHINING INCLINED BALL SEATS
Filed Sept. 1, 1950 2 SHEETS—SHEET 1
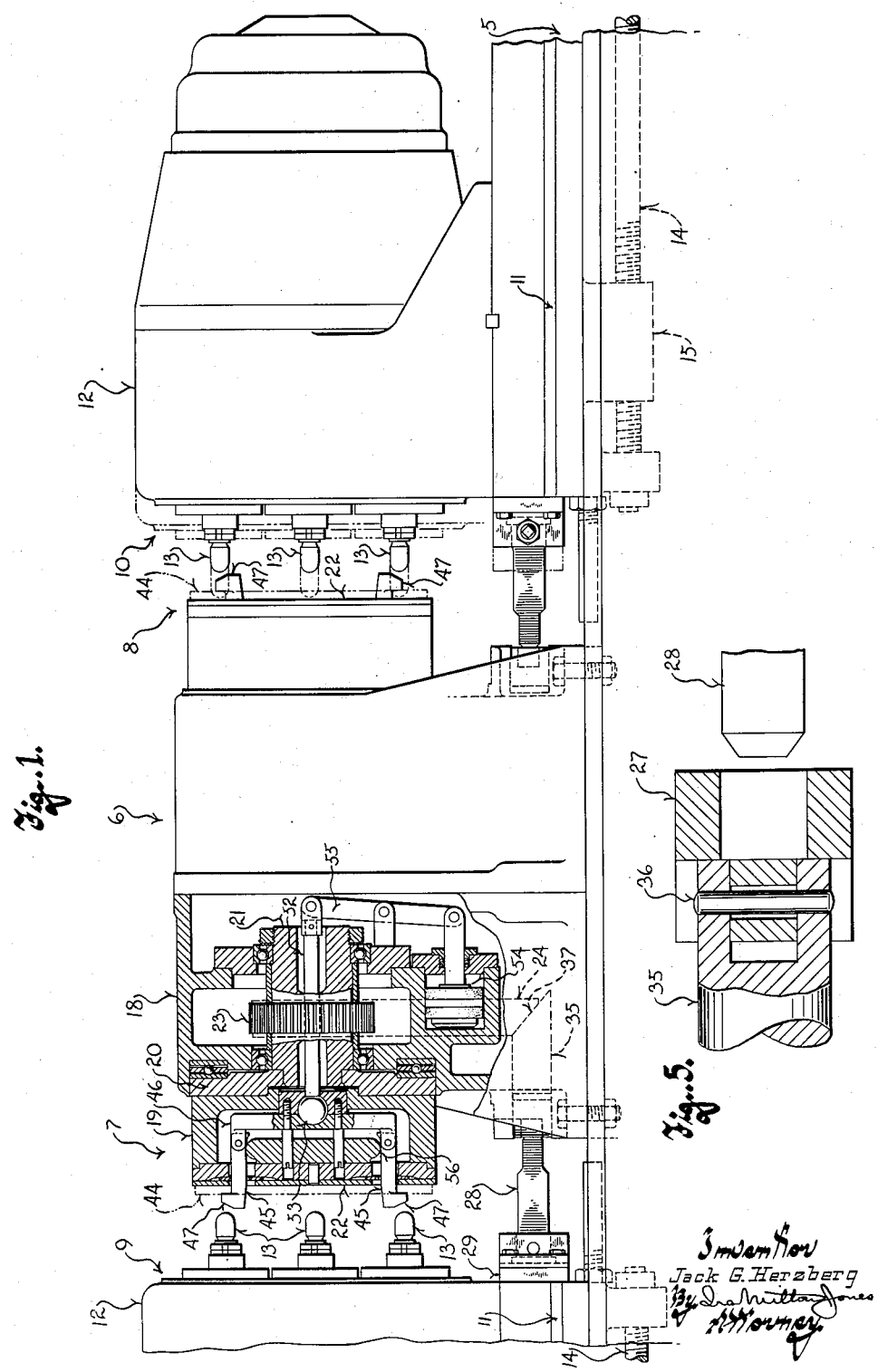

Dec. 2, 1952 J. G. HERZBERG 2,619,878
APPARATUS FOR MACHINING INCLINED BALL SEATS
Filed Sept. 1, 1950 2 SHEETS—SHEET 2
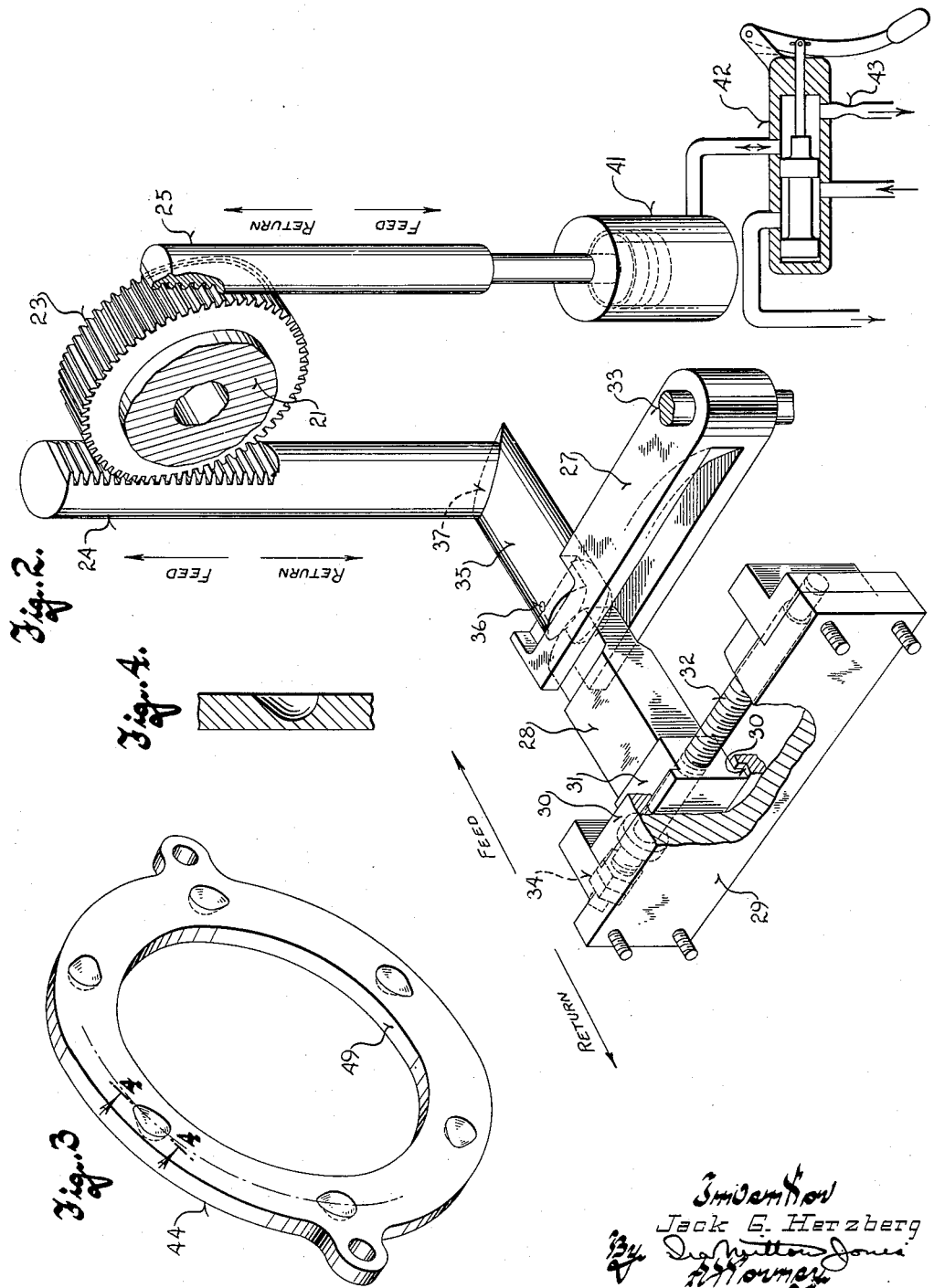
Inventor
Jack G. Herzberg Patented Dec. 2, 1952

2,619,878

UNITED STATES PATENT OFFICE 2,619,878

APPARATUS FOR MACHINING INCLINED BALL SEATS

Jack G. Herzberg, Milwaukee, Wis.

Application September 1, 1950, Serial No. 182,685

8 Claims. (Cl. 90—14)

This invention relates to machine tools and refers more particularly to a machine for cutting arcuate grooves in the face of a piece of work, such as a clutch or brake member, which grooves are tapered in depth and are thus particularly adapted to provide "inclined" ball seats.

Some types of clutches and brakes are equipped with a pair of opposed coaxial rings or plates which are mounted for limited rotation relative to one another and for relative axial motion toward and from one another. They are urged toward face-to-face engagement and the inner face of at least one of the two members is provided with a plurality of arcuate grooves which are tapered in depth and in each of which a ball is seated and held in place by engagement with the opposing face of the other member. When one of the rings or plates is rotated with respect to the other, each ball is naturally compelled to roll along its groove, and since the grooves are tapered in depth the balls wedge the two members apart as they roll up the inclined bottoms of the grooves, thereby impelling the members away from one another and thus actuating the clutch or brake means.

It will be seen that a mechanism of this type is extremely useful generally for converting rotary motion into axial motion and that it has several important advantages. For example, a relatively small torque force applied to the rotatable plate can be converted into a short but powerful axial movement of one of the plates, and the stroke (and thus the thrust force) of the axially movable plate is capable of very precise control. Moreover, since the balls, riding in their tapered grooves, provide only negligible friction, this type of motion translating device is highly efficient. Despite the advantages of such mechanisms, however, their use in brake and clutch devices has not become widespread because of the difficulties which have heretofore attended the production of plates having inclined ball seat grooves.

Obviously, all of the grooves in the plate or ring which carries the balls must be accurately located, and they must have a uniform depth and taper to avoid any possibility of binding and twisting between the opposed plates. In the past it was customary to form the several inclined ball seats in separate inserts which were then secured in place in slots or holes in the plate or ring. This procedure was complicated and costly and the high degree of accuracy which is necessary in a device of this type was exceedingly difficult to obtain.

With this objection to past practice in mind, it is an object of this invention to provide a machine which will cut a plurality of ball seats directly into the face of a ring, plate, or similar member, which ball seats will comprise arcuate grooves tapered in depth.

Another object of this invention resides in the provision of a machine which, in a single operation, will simultaneously cut a plurality of inclined arcuate grooves (ball seats) in the face of a piece of work.

Another and very important object of this invention resides in the provision of a machine of the character described in which the angle of taper or inclination of the arcuate ball seat grooves cut by the machine can be readily adjusted.

Still another object of this invention resides in the provision of means in a machine of the character described for gripping a piece of work and rotating it eccentrically with respect to an advancing cutting tool, and at a rate which is in synchronization with the rate of advance of the cutting tool into the work, to thereby enable the tool to cut into the face of the piece of work an arcuate groove of progressively increasing depth and predetermined inclination.

A further object of this invention resides in the provision of simple means, in a machine of the character described, for adjusting the rate of rotation of a work carrying member with respect to the rate of advance of an eccentrically disposed cutting tool, to thereby adjust the taper or angle of inclination of arcuate grooves formed in a face of the work by the cutting tool.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a fragmentary side view of a machine embodying the present invention, portions thereof being shown in side elevation and other portions being shown in vertical section;

Figure 2 is a diagrammatic perspective view of the motion transmitting connection between the tool and work holding members of the machine of this invention by which connection linear motion of the tool holding member toward the work holding member is translated into rotation of the latter, portions of the members comprising the connection being shown broken away to illustrate details thereof;

Figure 3 is a perspective view of a ring having a plurality of arcuate inclined ball seat grooves formed therein by a machine embodying the principles of this invention;

Figure 4 is a sectional view taken on the plane of the line 4—4 in Figure 3 and illustrating the contour of a cut formed by a machine of this invention; and Figure 5 is a fragmentary sectional view through a portion of the motion transmitting connection shown in Figure 2.

Referring now particularly to the accompanying drawings, in which like numerals designate like parts throughout the several views, the numeral 5 designates generally a base or bed, only a portion of which is shown and upon which the components of the machine of this invention are mounted. The machine is preferably designed to operate upon two pieces of work simultaneously, and accordingly the components mounted upon the bed are substantially duplicated.

In general, the units mounted on the bed comprise a stationary fixture 6 at the center of the bed and upon which are mounted a pair of work holders 7 and 8 which face in opposite directions, and a pair of tool holders 9 and 10 which are movably mounted near the ends of the bed for reciprocation toward and from the work holders 7 and 8, respectively. The bed is provided with two sets of tracks or ways 11 upon each of which one of the tool holders is slidably mounted for motion toward and from the work holder with which it cooperates.

Each tool holder comprises a housing 12 in which are contained a motor (not shown) and drive gears and/or change gears (not shown) and it has a number of rotary cutting tools 13 mounted at its front and driven by the motor and gears in a suitable manner. It will be understood that the term "cutting tools" embraces milling cutters or similar edged tools as well as abrading tools of appropriate shapes and sizes. In any event, however, the profile of the cutting tool tip should obviously conform to the cross-sectional contour of the groove intended to be cut thereby, and this, in turn, should preferably conform quite closely to the ball to be seated therein. More specifically, the cutting tip of the tool will ordinarily be semicircular in profile, with a radius substantially equal to that of the ball to be seated in the groove to be cut thereby. The several cutting tools carried by each tool holding member are disposed in a circle, equidistant from one another and from a common center, and their rotational axes are all parallel to the path of reciprocating movement of the tool holding member along the ways.

The tool holder is moved toward and from the fixture 6 by any suitable mechanism, as for example by automatic hydraulic actuating means or, as shown primarily for the sake of illustration, by means of a lead screw 14 rotated in any desired manner. The screw is journaled in bearings fixed with respect to the bed and passes through a threaded follower 15 carried by the tool holder. Other devices suitable for imparting reciprocatory motion to the tool holder will readily suggest themselves to those skilled in the art.

The stationary fixture 6 comprises a pair of substantially duplicate hollow housings 18, each of which provides mounting means for a rotatable work holder 7 adapted to grip a piece of work to be acted upon by the cutting tools 13 and by which the work is rotated during cutting advance of the tools toward the same to enable the cutting tools to form progressively deepening arcuate slots in the face of the work.

Each work holder comprises an intermediate cup shaped head 19 secured to a rear thrust plate 20 which in turn is fixed to a hollow shaft 21 extending concentrically rearwardly therefrom; and a front plate assembly 22 closing the open front of the end shaped head, and against which the work is adapted to be clamped. The shaft 21 is journaled in the housing 18 with its rotational axis parallel to the path of reciprocation of the tool holder (and thus to the axes of the tools) and, of course, eccentric to each of the cutting tools but defining the center of the circle on which they are disposed. Rotation is imparted to the hollow shaft, and thus to the work holding member, by means of a pinion 23 which is secured to the hollow shaft 21 and which is actuated in opposite rotational directions by means of a feed rack 24 and a return rack 25 (see Figure 2). The racks 24 and 25 are mounted vertically in the housing and guided thereby for endwise up and down motion, parallel to one another and mesh with the pinion at diametrically opposite sides thereof. The feed rack 24 rotates the pinion in one direction during the feed stroke of the machine (i. e., during movement of the tool holding member toward the work holding member) while the return rack 25 drives the pinion in the opposite direction during the return portion of the machine cycle.

It will be understood that the taper ratio or angle of inclination of the ball seat grooves to be cut by the machine of this invention will depend upon the ratio of the rate of feed of the tool holding member to the rate of rotation of the work holding member. In other words, the work holding member must be rotated at a rate which is synchronized with the rate of advance of the tool into the work. More specifically, if it is desired to cut grooves having a relatively shallow taper, the work holder must rotate relatively faster for a given rate of travel of the tool holder or, what is the same thing, must rotate through the angle necessary to form a slot of the desired length during a relatively short cutting feed travel of the cutting tool.

The actual maximum depth of the slot which is cut by the machine is, of course, dependent upon that portion of the feed stroke during which the cutting tool is engaged with the work; and this may be controlled by regulating the number of revolutions of the lead screw 14 during each half cycle of the machine, or, in the event some other type of feed mechanism is employed, by means which will be equally obvious to those skilled in the art.

Rotation of the work holder as well as adjustment of its rate of rotation relative to the rate of feed of the tool holder is accomplished by means of the motion transmission means illustrated in Figure 2. This means comprises a pusher 26 mounted on a cross bracket 29 on the tool holding member and extending forwardly therefrom toward the fixture to engage a lever 27 mounted on a vertical pivot 33 on the fixture to swing in a horizontal plane. The lever normally extends substantially transversely to the path of the tool holder, and it is adapted to be engaged and operated by the pusher 28 at the instant of engagement of the tools 13 with the work on the work holder.

The front of the bracket 29 has channel forming members 30 thereon in which a T-shaped head 31 on the pusher is guided for sliding motion from side to side, transversely to the path of reciprocation of the tool holder; and a lead screw 32 journaled in the bracket passes through a suitably threaded hole in the head 31 to enable precise adjustment and location of the pusher at any position along the bracket. Consequently, as the pusher is adjusted to positions in which it will engage the lever 27 nearer its pivot 33 (i. e., to the right in Figure 2) the lever will be swung through a greater arc for a given travel of the tool holder. Lock nuts 34 on the lead screw 32 enable the screw to be held against accidental displacement from any desired adjustment of the pusher position.

Swinging motion of the lever toward the fixture is translated into upward motion of the feed rack 24, and thus into rotation of the pinion 23, by means of an elongated cam member 35. One end of the cam member 35 is pivotally connected to the free end of the lever by a pin 36, while its opposite end extends under the lower end of the feed rack 24 and has a slanting cam surface 37 which slopes upwardly toward the lever 27 and engages flatwise with a correspondingly slanted surface at the bottom of the feed rack.

Thus swinging motion of the lever by the pusher 28 at the time of engagement of the tools with the work imparts endwise movement into the fixture to the cam member 35, and this causes the inclined surface on the cam member to force the rack 24 upwardly; and since the amount of such endwise movement of the cam member, and consequently of the rack 24, is governed by the amount of swing of the lever 27, it will be seen that adjustment of the pusher by means of the lead screw 32 will result in adjustment of the amount of rotation imparted to the pinion and work holder for a given amount of movement of the tool holder. Thus the rate of rotation of the tool holder is always synchronized with the rate of advance of the tools into the work, even though the ratio of feed to rotation is adjustable to achieve the milling of different angles of inclination of the ball seats.

Since it is undesirable to have the work rotate during withdrawal of the tool in the course of the second half of the machine cycle, the pusher merely backs away from the lever during retraction of the tool holder, while the work holder remains stationary, but after the tool holder has withdrawn the tool from engagement with the work, the work holder is rotated back to its initial position by upward movement of the return rack 25. The return rack is actuated by means of a hydraulic jack 41 to which fluid is supplied under pressure through a selector valve 42. If desired, a ball check valve (not shown) interposed between the valve and the cylinder of the jack and constructed to permit fluid to bleed out of the jack cylinder relatively slowly during the feed stroke may be employed, so that a back load is imposed by the return rack 25 during this time, thereby precluding the possibility of backlash in the rack-pinion connection which might result in variations in the length of the slots cut by the machine. The same function is accomplished, however, by the provision of a restriction 43 in the jack cylinder return line leading from the valve 42. It will be understood that when the tools have been withdrawn sufficiently from the grooves which they have cut, the position of the valve 42 is changed (either manually or automatically by the motion of the tool holder) to admit fluid under pressure to the cylinder of the jack 41 to thereby raise the return rack 25 and rotate the pinion back to its initial position. The valve 42, of course, may be solenoid operated if desired to enable automatic return of the work holder after the tools have been withdrawn from the work.

During the return stroke the feed rack 24 is driven downwardly by the pinion and its slanting lower end "wedges" the cam member 35 outwardly of the fixture and thus returns the lever 27 to its initial position for engagement by the pusher during the next feed stroke of the machine cycle.

A plate or ring 44 in which ball seats are to be cut by the machine of this invention is held in place on the front plate assembly 22 of the work holder by means of two or more opposed jaws which preferably comprise arms 45 pivotally mounted near their inner ends on a carrier 46 and extending therefrom through the front plate assembly so that the hooked outer extremities 47 of the arms project ahead of it a distance substantially equal to the thickness of the plate or ring to be held by the jaws. As a rule the part to be grooved is annular, having a relatively large central aperture 49, and in that case the arms will preferably project through the aperture in the part and will swing outwardly, away from one another, in order to assume their operative position in which the hooks 47 at their extremities point away from one another and overlie the front face of the plate to clamp the plate between themselves and the front face of the work holder.

The carrier 46 by means of which the arms are moved to and from a work clamping position, and to which they are pivotally connected, is mounted at the interior of the hollow head, concentrically therewith, and is guided for axial reciprocating motion therein. A link rod 52, passing through the hollow shaft 21 on which the head is mounted, has a ball-and-socket connection 53 with the carrier, and by means of this connection endwise reciprocating motion of the link rod is imparted to the carrier. The link rod is actuated by the piston of a hydraulic or pneumatic cylinder 54, with which its rear end is connected by means of an intermediately fulcrumed lever 55. Operation of the cylinder may be controlled in any suitable manner, either manually or automatically, in synchronization with the working cycle of the machine.

As the carrier moves forwardly the arms 45 of course move with it. Their rear end portions, behind their pivotal connections with the carrier, are curved inwardly toward one another and engage a cam 56 on the rear of the front plate assembly, and as the curved rear ends of the arms ride outwardly around this cam, their hooked front ends are cammed inwardly, toward one another, to an inoperative work-releasing position. When the cylinder mechanism 54, through the lever 55 and the link rod 52, moves the carrier rearwardly, the straight forward portions of the arms ahead of their pivot points are drawn into engagement with the cam 56 and the outer ends of the arms are thus swung apart, to their operative positions, where they are held by the cam so long as the carrier remains in its rearward position.

Since the cylinder mechanism 54 is under positive fluid pressure when the arms are in their operative position, it will exert a rearward clamping force upon them through the lever 55 and the link rod 52 and they will therefore hold the work tightly clamped against the front face of the head.

It will be appreciated that the duplicate construction of the machine herein shown and described will enable either the simultaneous production of two identical pieces of work or the simultaneous production of two different (but possibly complementary) members, depending upon how the machine is set up. It will also be understood that although the machine is shown and described as having reciprocating tool holders and rotating work holders, this arrangement may be reversed and the work holders made to reciprocate while the tool holders revolve, or one of these members may be made both to revolve and reciprocate with respect to the other.

From the foregoing description taken together with the accompanying drawings, it will be readily apparent that this invention provides a machine for automatically and simultaneously cutting a plurality of arcuate tapered ball seat grooves in a ring or plate of the type used in clutch and brake actuating mechanisms, and that the machine of this invention provides very simple adjustment means for accurately predetermining the taper or slope of such grooves.

What I claim as my invention is:

1. In a machine of the character described: a tool holding member having a cutting tool thereon; a work holding member; means mounting said tool and work holding members for relative linear motion toward and from one another along a predetermined linear path to carry the tool on the tool holding member into and out of engagement with work on the work holding member; means mounting one of said members for rotation relative to the other about an axis substantially parallel to said linear path but eccentric to the tool on the tool holding member; means for simultaneously imparting relative motion to said members toward one another along said path and rotary motion to said rotatable member in synchronization with the rate of advance of the tool into the work to cause the tool on the tool holding member to make an arcuate progressively deepening cut in the work, said means including a gear fixed on the rotatable member, and means geared to said gear for translating linear motion of said members toward each other into rotation of said gear in one direction; and other motion producing means geared to said gear for rotating the same in the opposite direction.

2. In a machine of the character described: a tool holding member having a cutting tool thereon; means constraining the tool holding member to reciprocatory motion along a defined linear path; a fixture stationarily mounted in the path of reciprocatory motion of the tool holding member; a work holding member on said fixture adapted to hold work thereon for engagement by the tool on the tool holding member upon reciprocatory motion of the latter toward the fixture; means mounting one of said members for rotation relative to the other about an axis substantially parallel to said path but eccentric to the tool on the tool holding member; means for imparting rotary motion to said rotatable member simultaneously with motion of the tool holding member toward the fixture and at a slow rate which is synchronized with the rate at which the tool is advanced into the work, said means comprising a gear fixed to the rotatable member, and means having a part thereof geared to said gear for translating linear motion of the tool holding member toward the work holding member into rotation of the gear in one direction; and other motion producing means geared to said gear for effecting rotation thereof in the opposite direction.

3. In a machine of the character described: a tool holding member having a rotatable cutting tool thereon; a stationary fixture; means mounting the tool holding member for reciprocatory motion along a defined linear path substantially parallel to the axis of rotation of the cutting tool toward and from the fixture; a work holding member on the fixture facing the rotatable cutting tool, said work holding member being mounted for rotation about an axis parallel to said linear path of reciprocatory motion but eccentric to the axis of the cutting tool; a motion transmitting member mounted in said stationary fixture and constrained to linear movement parallel to the linear path of reciprocation of the tool holding member; a pusher on the tool holding member operable to impart inward sliding movement to said motion transmitting member as the tool holding member is moved to advance the tool toward the work held by the work holding member; a motion transmitting connection between said linearly movable motion transmitting member and the work holding member including a gear coaxial with and fixed with respect to the work holding member and a rack and through which inward sliding movement of the motion transmitting member rotates the work holding member in one direction so that the tool will cut an arcuate progressively deepening cut in the work; and other motion producing means drivingly connected with the gear to effect retrograde rotation of the gear and the work holding member.

4. In a machine of the character described: a tool holding member having a rotatable cutting tool thereon; a stationary fixture; means mounting the tool holding member for reciprocation along a defined linear path substantially parallel to the axis of rotation of the cutting tool toward and from the fixture; a work holding member on the fixture facing the rotatable cutting tool, said work holding member being mounted for rotation about an axis parallel to said linear path but eccentric to the axis of the cutting tool; and means for translating linear motion of the tool holding member toward the work holding member into rotary motion of the latter so that the tool will cut an arcuate progressively deepening cut in work held by the work holding member, said means comprising a lever mounted for pivotal motion about an axis fixed with respect to the fixture and having an arm extending substantially transversely to the path of motion of the tool holding member, an elongated motion transmitting member pivotally connected at one end to said lever at a point thereon spaced from its pivot axis, and constrained to endwise motion, a connection between said elongated member and the work holding member operable to translate endwise motion of said motion transmitting member into rotary motion of the work holding member, a pusher, and means adjustably mounting said pusher on the tool holding member, with the pusher projecting toward said arm of the lever and, so that upon movement of the tool holding member toward the fixture, the pusher engages said arm to swing the lever in one direction about its pivot axis, said pusher being adjustably translatable transversely to the path of motion of the tool holding member to enable the pusher to engage said arm of the lever at different distances from its pivot axis to thereby enable adjustment of the angle through which the work holding member is rotated for a given amount of motion of the tool holding member toward the same.

5. In a cutting tool of the character described: a stationary fixture; a tool holding member; means movably mounting the tool holding member for reciprocation toward and from the fixture along a defined path, said tool holding member having a cutting tool thereon facing the fixture and rotatable about an axis substantially parallel to said path of reciprocation; a work holding member mounted on the fixture for rotation about an axis parallel to said path of reciprocation, eccentrically to the axis of the rotatable cutting tool and facing the tool; a gear coaxial with the axis of rotation of the work holding member fixed with respect to the work holding member; a rack meshing with the gear; a driving connection between the rack and the tool holding member through which movement of the tool holding member toward the work holding member to effect endwise movement of the cutting tool into the work held by the work holding member is translated into endwise movement of the rack in one direction to thereby rotate the gear and the work holding member and cause the tool to make an arcuate cut of predetermined length and progressively increasing depth; and other motion producing means drivingly connected with the gear to effect retrograde rotation of the gear and the work holding member upon retraction of the reciprocable tool holding member.

6. In a machine of the character described: a tool holding member having a cutting tool thereon; a work holding member; means mounting one of said members for reciprocating motion toward and from the other along a predetermined linear path, during which motion the cutting tool is adapted to cut into a face of work held on the work holding member; means mounting one of said members for rotation relative to the other about an axis substantially parallel to said linear path but eccentric to the tool on the tool holding member; a motion transmitting connection between said members for translating linear motion of the reciprocatory member toward the rotatable member into rotation of said rotatable member in one direction; and means forming a part of said connection for adjusting the angle through which said rotatable member is rotated for a given advance of the tool into the work during motion of said reciprocatory member toward the other.

7. In a machine of the character described, the combination set forth in claim 6 further characterized by the fact that said last named means comprises a pivoted lever on one of said members, a pusher on the other of said members in position to engage the lever outwardly of its pivot and swing the lever on its pivot as said members move toward each other, and means for effecting translatory adjustment of said pusher lengthwise of the lever.

8. In a machine of the character described: a tool holding member having a rotatable cutting tool thereon; a stationary fixture; means mounting the tool holding member for reciprocatory motion along a defined linear path substantially parallel to the axis of rotation of the cutting tool toward and from the fixture; a work holding member on the fixture facing the rotatable cutting tool, said work holding member being mounted for rotation about an axis parallel to said linear path but eccentric to the axis of the cutting tool; and means for translating linear motion of the tool holding member toward the work holding member into rotary motion of the latter so that the tool will cut an arcuate progressively deepening cut in work held by the work holding member, said means comprising a lever mounted for pivotal motion about an axis fixed with respect to the fixture and normal to the linear path of motion of the tool holding member, with its outer end extending substantially transversely to said path, a motion transmitting member pivotally connected at one end to said lever at a point thereon spaced from its pivot axis and constrained to endwise motion; a driving connection between said motion transmitting member and the work holding member for translating endwise motion of said member into rotary motion of the work holding member, and a pusher on the tool holding member projecting toward the lever and engageable therewith upon movement of the tool holding member toward the fixture to swing the lever about its pivot axis.

JACK G. HERZBERG.

REFERENCES CITED

The following references are of record in the file of this patent:

UNITED STATES PATENTS

| Number | Name | Date |
|---|---|---|
| 529,013 | Barnes | Nov. 13, 1894 |
| 1,312,394 | Gorton et al. | Aug. 5, 1919 |